No. 683,459. Patented Oct. 1, 1901.
A. J. FRITH.
VALVE GEAR FOR DIESEL MOTORS.
(Application filed June 22, 1899.)
(No Model.) 4 Sheets—Sheet 1.
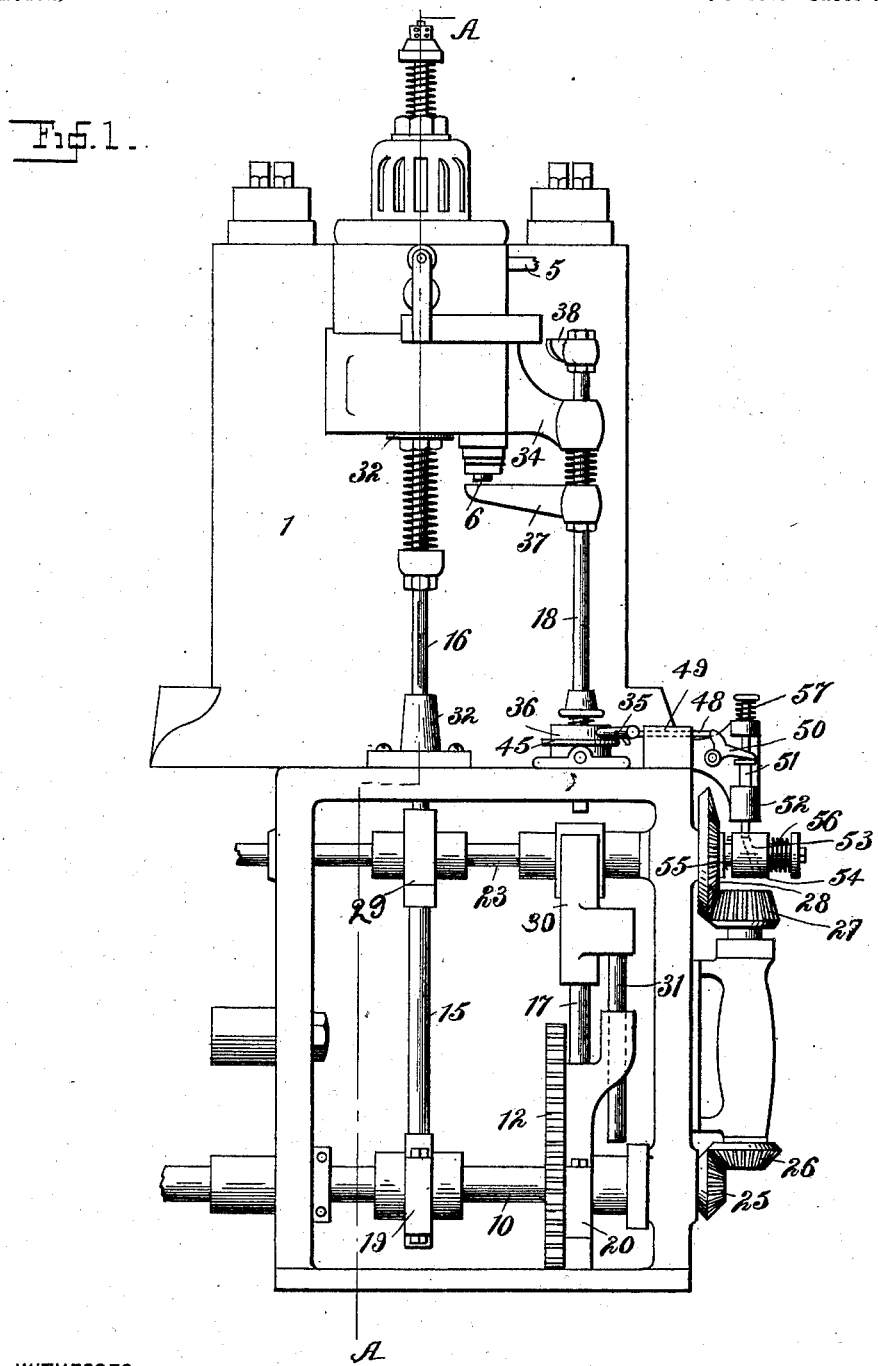
WITNESSES:
Grace A. Taylor
H. Nash Reid
INVENTOR
Arthur J. Frith

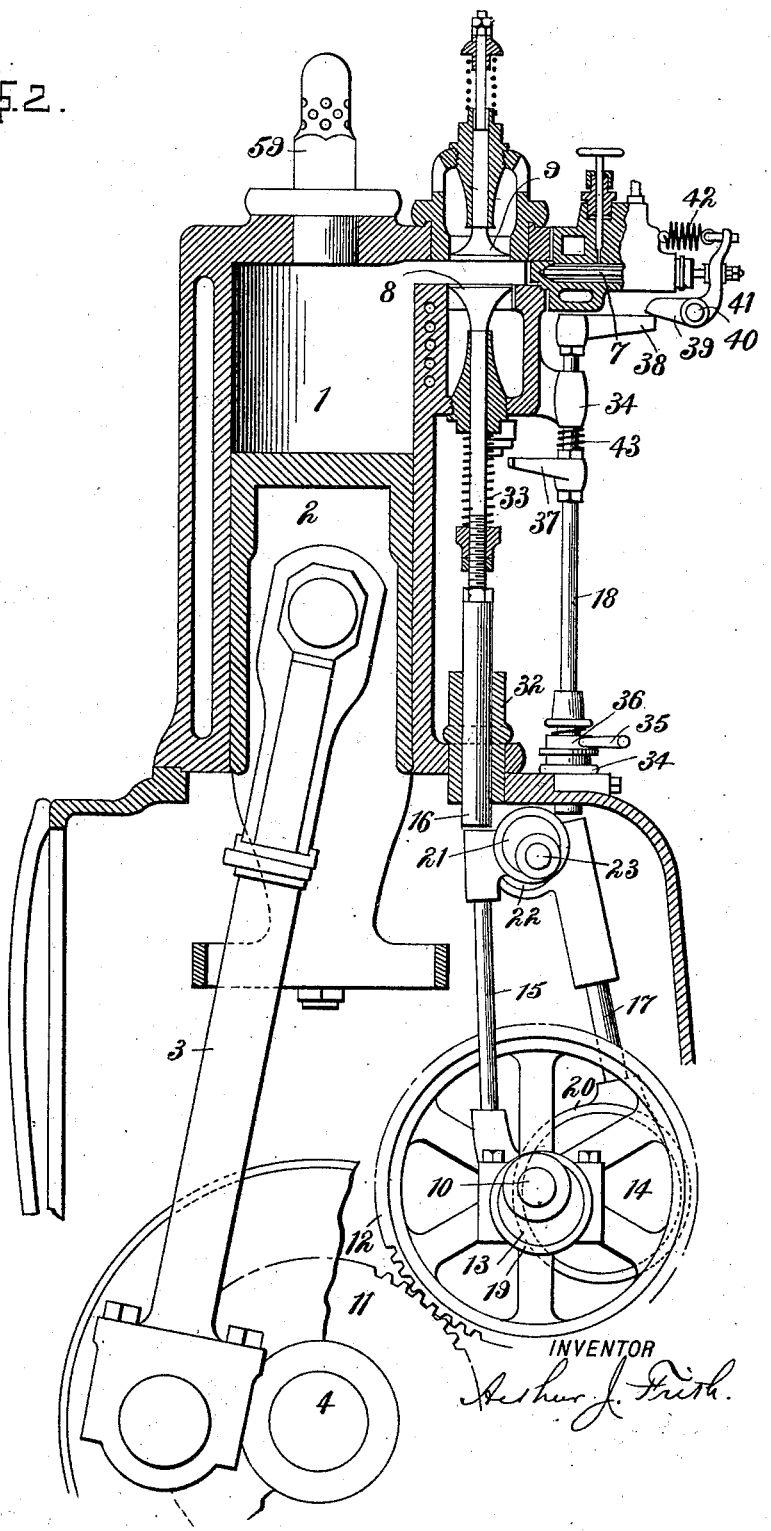

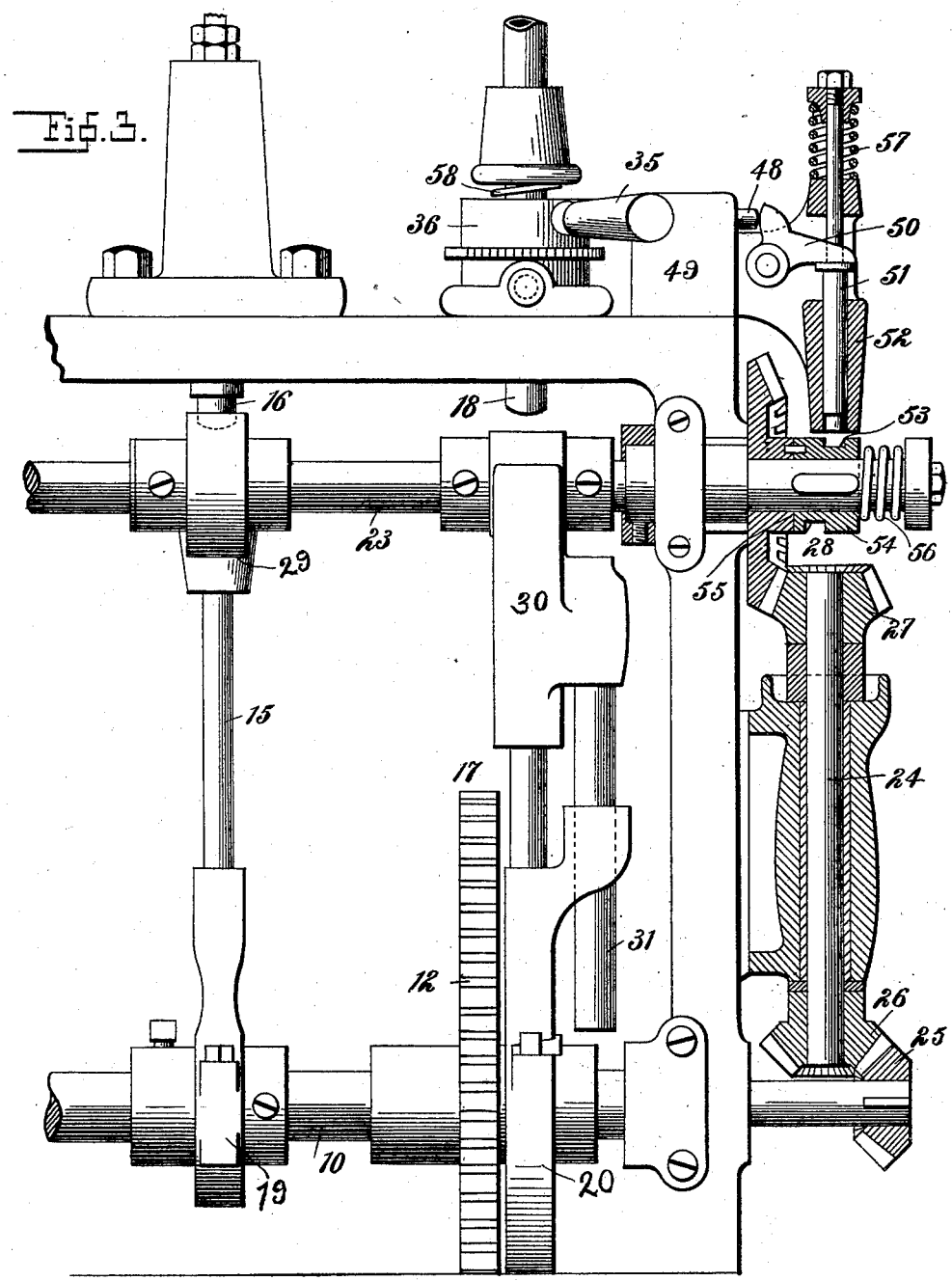

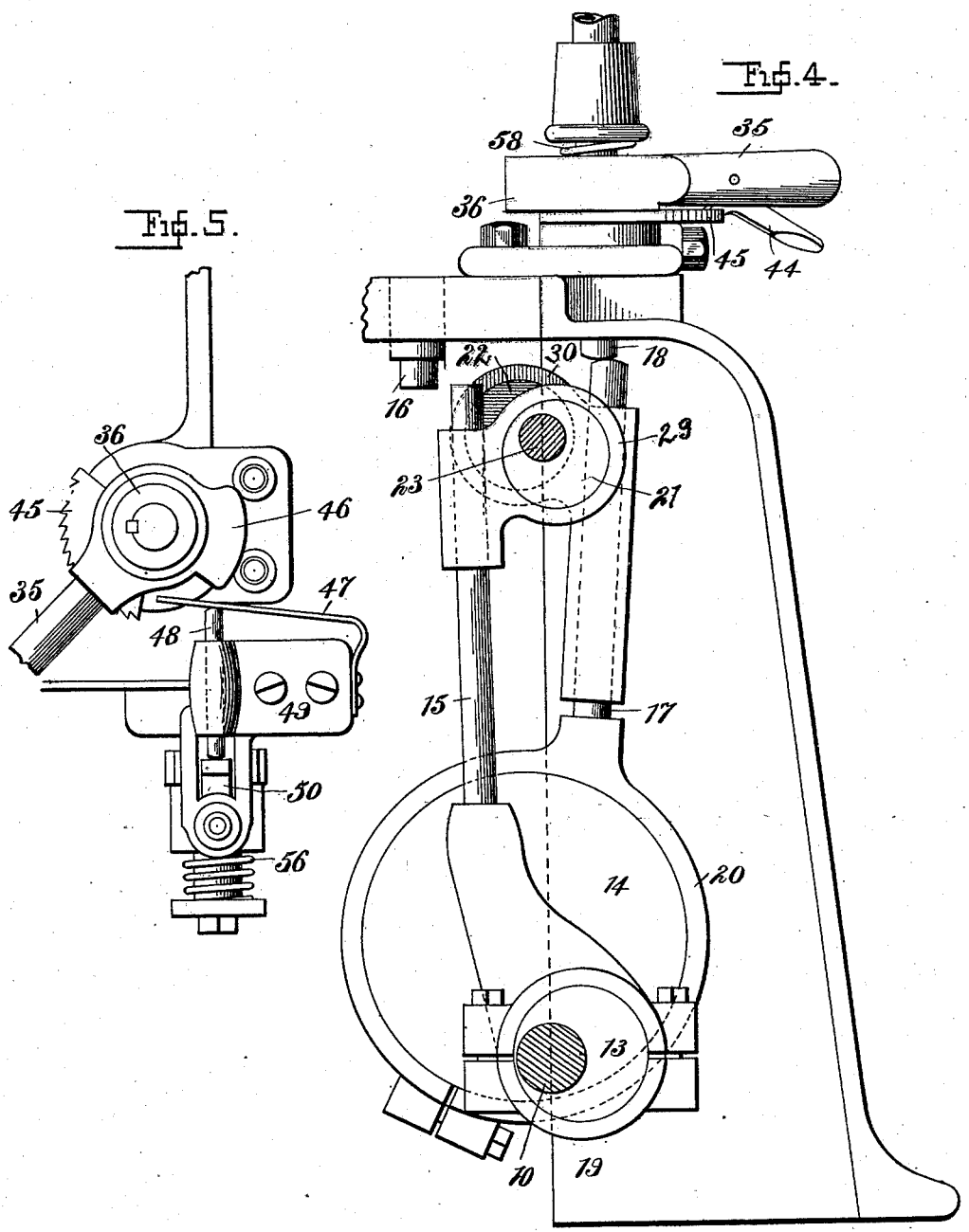

UNITED STATES PATENT OFFICE.

ARTHUR J. FRITH, OF NEW YORK, N. Y., ASSIGNOR TO DIESEL MOTOR COMPANY OF AMERICA, OF SAME PLACE.

VALVE-GEAR FOR DIESEL MOTORS.

SPECIFICATION forming part of Letters Patent No. 683,459, dated October 1, 1901.

Application filed June 22, 1899. Serial No. 721,430. (No model.)

*To all whom it may concern:*

Be it known that I, ARTHUR J. FRITH, a citizen of the United States, residing in the borough of Manhattan, in the city, county, and State of New York, have invented certain new and useful Improvements in Valve-Gears for Diesel Motors, of which the following is a specification.

This invention relates to improvements in valve-gears for Diesel motors or generally for internal-combustion engines operating on the four-stroke or Otto cycle and provided with means for admitting compressed air to start the motor. In such an engine positive operation of the fuel and exhaust valves during the regular running of the engine is only required once in each cycle—that is, once in two revolutions of the engine-shaft. On the other hand, in starting the machine it is desirable to admit compressed air at each revolution, so as to obtain greater certainty and effectiveness in starting. My invention provides means whereby the engine may be run on a two-stroke cycle when starting with compressed air and may then be run on a four-stroke cycle with fuel, these operations being accomplished by one and the same mechanism.

My invention also comprises certain features of construction of the mechanism referred to, as hereinafter set forth.

Referring to the accompanying drawings, which form a part of this specification, Figure 1 is an end elevation of so much of the internal-combustion engine as relates to my invention. Fig. 2 is a vertical section of same on line A A in Fig. 1. Figs. 3 and 4 are enlarged views of portions of Figs. 1 and 2, showing the eccentric mechanism and associated parts. Fig. 5 is a top view of the controller or starting-handle and the coöperating mechanism.

Referring to Figs. 1 and 2, 1 represents the cylinder, 2 the piston, 3 the connecting-rod or pitman, and 4 the main shaft, of an internal-combustion engine. Such engine being of the Diesel type is provided with means for supplying compressed air to start the operation thereof, such compressed air being supplied through a pipe 5, leading to the usual air-tank. A valve 6 controls the connection from this pipe to the cylinder 1. Adjacent to this valve are shown the fuel-valve 7, exhaust-valve 8, and the valve 9, which admits atmospheric air in the regular operation of the engine.

On a shaft 10, which is connected to the main shaft by gearing 11 12, so as to be rotated at the same speed as such main shaft, is arranged the eccentric 13, which operates the exhaust-valve, and on the same shaft is also arranged an eccentric 14, that is adapted to operate either the compressed-air-admission valve or the fuel-valve, according to the position of the connecting and controlling mechanism. Both the exhaust-valve gear and the fuel-valve gear are provided with connecting means that during the regular operation of the machine brings each of the respective valves into operation only once during the four-stroke cycle, and means are also provided whereby these connecting means may be brought into such position that they will operate their respective valves once in every revolution or twice during the four-stroke cycle, the connecting means for the fuel-valve gear being at the same time shifted to be free of the fuel-valve and to operate the compressed-air valve. The connecting means aforesaid comprises eccentric-rod 15 and valve-gear rod 16 for the exhaust and eccentric-rod 17 and valve-gear rod 18, which serve for either fuel or compressed air, the eccentric-rods 15 and 17 being attached to the respective eccentric-straps 19 and 20 on eccentrics 13 and 14. The position and operation of the eccentric-rods 15 and 17 are controlled by the respective auxiliary eccentrics 21 and 22, arranged on an auxiliary shaft 23, which is connected by an intermediate shaft 24 and bevel-gears 25 26 27 28 to shaft 10, so as to revolve at half the speed of shaft 10, the said shaft 23 thus revolving once during each four-stroke cycle. The eccentric-rods 15 and 17 pass through and are guided in guide-bearings in the eccentric-straps 29 30 of the eccentrics 21 and 22, so that as the said eccentrics revolve they shift the ends of rods 15 and 17 in and out of engaging relation with the respective valve-gear rods 16 and 18. In order to more effectually guide the eccentric-rod 17, the eccentric-strap 30 may have a guide-rod 31 extending therefrom and passing through a guide-bearing in eccentric-strap 20, as shown in Figs. 1 and 3. Valve-gear rod 16 is mounted to slide in fixed bearings 32 and is pressed by a spring 33 toward the eccentric-rod 15, so as to hold the exhaust-valve 8 closed. Valve-gear rod 18 is mounted to turn as well as slide in fixed bearings 34, and its angular position is adjusted by a manual controlling device, such as a handle 35 on a collar 36, which is splined or otherwise secured on rod 18, so as to turn therewith, but not to partake of its longitudinal movement. Toe 37 on the rod 18 is adapted to engage the stem of the compressed-air valve 6 when the rod is in a certain angular position, while in another angular position of the rod a toe 38 thereon is adapted to engage with a rocker-arm 39, which operates the fuel-valve 7 through rock-shaft 40 and arm 41. The fuel-valve-operating arm 39 is pulled toward the cut-off position by a spring 42, and the valve-gear rod 18 is held toward the eccentric-rod and away from valve-operating position by a spring 43. By means of a spring-latch 44 on handle 35 engaging in a fixed toothed plate 45 the handle 35, collar 36, and rod 18 may be held in any desired angular position, so as to either bring the toe 37 into operative relation with compressed-air valve 6 or to bring the toe 38 into operative relation with the fuel-valve rocker or to place both of said toes out of such operative relation, as may be desired.

The collar 36 is provided with a cam 46, engaging with a leaf-spring 47, bearing on a pin 48, which slides in a fixed bracket 49, and engages an arm of an angle-lever 50, whose other arm engages with a pin 51, sliding in a fixed bracket 52 and adapted to engage at its end in a cam-groove 53 in a clutch-collar 54, splined or otherwise mounted on the shaft 23, so as to turn therewith, but to slide longitudinally thereon. This clutch member 54 engages with the hub 55 of bevel-gear 28, as by a pin-and-hole connection or otherwise, so that these two members 54 55 constitute a clutch, whereby the shaft 23 may be caused to revolve with the gear 28 or to be disconnected therefrom. Such disconnection takes place when the pin 51 is forced down into the cam-groove 53, the cam-groove being so inclined to the plane of rotation of collar 54 that as the said collar revolves it will be pushed endwise by the pin, so as to disengage the clutch, the collar being finally stopped in a definite angular position by the engagement of the pin 51 with the end of cam-groove 53. A spring 56 tends to push the collar 54 into position to cause engagement of the clutch when such collar is released from pin 51, and said pin 51 is pressed away from collar 54 by a spring 57, so as to be released therefrom when the handle 35 is turned, so as to remove the cam 46 from engagement with the pin 48 on the spring 47. The object of spring 47 is to enable the cam 46 to operate the pin 48 more smoothly.

58 represents a buffer-spring to act as a stop for the downward movement of rod 18.

59 represents the usual relief-valve.

The position of the parts for starting is indicated in Fig. 1, the handle 35 being so placed that the toe 37 is under the compressed-air valve 6, while the toe 38 is out of line with fuel-valve rocker 39. At the same time the clutch 54 55 is held disengaged by the action of parts 46, 48, and 51, and the shaft 23 is held in the position shown in Fig. 2, so as to maintain both the eccentric-rods 15 and 17 in operative relation with the corresponding valve-gear rods 16 and 18. Under these circumstances the operation of the eccentric-rods 15 and 17 by the respective eccentrics 13 14 will cause the exhaust-valve and the compressed-air valve to be each operated in sequence in each revolution of the engine, inasmuch as eccentrics 13 14 revolve at the same speed as the main engine-shaft, and the engine will start up as a single-acting air-engine, admitting compressed air and exhausting at every revolution. When full speed is attained or when the engine is well started, the handle 35 may be turned to position shown in Figs. 3, 4, and 5. This turning of the handle first moves the toe 37 away from under valve 6 and then brings the toe 38 under the fuel-valve-operating arm 39, at the same time turning cam 46, so as to release pins 48 and 51 and allow them to be moved by spring 57 to withdraw pin 51 from cam-groove 53, whereupon the clutch 54 55 is thrown into engagement by spring 56. The eccentrics 21 22 will rotate at one-half the speed of eccentrics 13 14 and will move the ends of eccentric-rods 15 17 in such manner that each of them will engage with its corresponding valve-gear rod 16 or 18 only on every other revolution of the eccentric 13 or 14, the operation being then as follows: In the first and second strokes of the four-stroke cycle the eccentric-rods 15 and 17 are held away from operative relation with the valve-operating rods, while in the third and fourth strokes they are maintained in such operative position. The first stroke is the outward stroke, drawing in atmospheric air through self-acting inwardly-opening valve 9. The second stroke is an inward compression-stroke and does not require the operation of any valve. The third stroke is the combustion-stroke, and during this stroke the fuel-valve 7 is opened by operation of eccentric-rod 17, valve-gear-operating rod 18, toe 38, and parts 39, 40, and 41. The fourth stroke is the exhaust or expulsion stroke, and the eccentric-rod 15 coöperates with valve-rod 16 to open the exhaust-valve 8 during this stroke. It is thus seen that in the four-stroke cycle there is but one opening of the exhaust-valve and one opening of the fuel-valve, the eccentric-rods 15 17 for exhaust and fuel each reciprocating twice in this time, but being so shifted by the auxiliary eccentrics 21 22 that each is made to hit the exhaust or the compressed-air valve-operating rod in one reciprocation and to miss it on the next. By means of the auxiliary controlling medium above described, which is connected to run at a lower speed than the main eccentrics, the valve-gear is enabled to operate at two periodicities—namely, a periodicity equal to the revolution period of the engine and a periodicity corresponding to two revolutions of the engine.

There are four operating conditions for this valve mechanism—first, when the fuel-valve toe is in line with the fuel-valve rocker and the auxiliary shaft is in clutch connection with the main eccentric-shaft, the fuel and exhaust valves being then opened once in every other revolution; second, when the valve-gear rod is turned by its handle far enough to move the toe 38 out of engaging relation with the fuel-rocker 39, but not far enough to bring the toe 37 into engaging relation with the compressed-air valve 6, neither the fuel nor the compressed-air valve being then operated, but the exhaust-valve being opened once in the four-stroke cycle; third, on revolving the valve-operating rod 18 still farther the cam 46 causes disengagement of the clutch and sets the eccentric-rods in such position that the exhaust-valve is operated in every revolution of the main eccentrics, while the valve-operating rod 18, although likewise reciprocated in every such revolution, is not operative for the reason that the toes 37 38 are both out of engaging relation, the exhaust-valve being then opened at every revolution and the engine running without compression, this condition being suitable for turning the engine over by hand and for stopping, and, fourth, on turning the valve-operating rod slightly farther the air-valve-operating toe is brought into engaging relation with the air-valve and the latter is opened in every revolution, as above described, the exhaust-valve being also opened in every revolution. This construction thus gives with one mechanism four conditions of running, two on the four cycle, one with fuel and one without, and two on the two cycle, one with compressed air and one without.

Comparing this valve mechanism with a valve mechanism having a single set of eccentrics rotating at one-half the engine speed and operating the valve-gear directly, it will be seen that the use of the auxiliary eccentrics enables the operating-eccentrics to be made much smaller for the same lift of valve. Thus if with an operating-eccentric revolving once in the four-stroke cycle the eccentric-rod is lifting the valve during, say, five per cent. of its stroke then an operating-eccentric which revolves at twice the speed will give the same time interval during ten per cent. of its stroke and will give the same lift of valve with a smaller diameter of eccentric, for if the eccentrics were made of the same size then an eccentric which operated the valve during ten per cent. of its stroke would obviously give a greater lift than one operating only through four per cent. of its stroke. Moreover, this large angle of effective operation of the eccentric, in connection with the small diameter of the eccentric, causes the tip of the eccentric-rod to move in a comparatively sharply-curved path instead of the flat path of a small arc on a large eccentric, thus enabling the eccentric to give a sharp quick action to the valve. I am thus enabled to use an eccentric for the fuel-valve, as well as for the exhaust-valve, in place of cams or similar mechanism. Inasmuch as the main eccentric-shaft revolves at the same speed as the main engine-shaft, it is obvious that the eccentrics may be mounted in such main engine-shaft in case the design of the machine will permit of it, thus saving one valve-shaft. The arrangement of both main and auxiliary eccentrics in parallel on shafts that are parallel to the main shaft enables the duplication or extension of the valve mechanism with the greatest facility when using a twin or multiple cylinder engine.

The advantage of supplying the compressed air in starting the engine on a two-stroke cycle or once in each revolution in place of the four-stroke cycle is that greater certainty and power are attained in starting and the positions in which the engine will start up in the case of a single-acting engine are doubled. This principle is clearly applicable to all internal-combustion engines working on the four-stroke cycle, whether the combustion be non-explosive or explosive. It is also apparent that the principle above described of controlling the mechanism—namely, the auxiliary eccentrics—so as to bring them into and out of operative relation with the valve-gear, is applicable generally to valve mechanism where the resultant rapidity of valve action is desirable or when it is desired to operate a valve at two different periodicities—that is, having periods of operation corresponding to different number of revolutions of the engine.

Having thus described my invention, what I claim as new therein, and desire to secure by Letters Patent, is—

1. In an internal-combustion engine, the combination with the fuel-valve thereof, of main ecccentric mechanism operated by said engine once during each revolution of the engine, and auxiliary eccentric mechanism operated by the engine once during every two revolutions thereof, and controlling the operative relation of such main eccentric mechanism with the said fuel-valve, so as to bring said fuel-valve into operation on every other revolution.

2. In an internal-combustion engine, the combination with the cylinder provided with fuel and compressed-air valves, of eccentric mechanism operated by the engine once in every revolution thereof, valve-gear mechanism and means for controlling same to bring either the fuel-valve or the compressed-air valve into operative relation with the eccentric mechanism, auxiliary controlling mechanism operated by the engine once in every two revolutions thereof and controlling the operative relation of the said eccentric mechanism with regard to the valve-gear mechanism so as to bring said valve-gear mechanism into operation once in every two revolutions on a four-stroke cycle, and means for maintaining said auxiliary controlling mechanism in fixed position to cause operation of the valve-gear once in every revolution in a two-stroke cycle.

3. In an internal-combustion engine, the combination with valve-gear mechanism, of eccentric mechanism operated by the engine once in every revolution thereof, auxiliary controlling mechanism controlling the operative relation of the eccentric mechanism with regard to the valve-gear mechanism, means for operating said auxiliary controlling mechanism once in every two revolutions of the engine to cause the valve-gear mechanism to operate on a four-stroke cycle, and means for maintaining the auxiliary controlling mechanism in position to cause the valve-gear mechanism to operate once in every revolution on a two-stroke cycle.

4. In an internal-combustion engine, the combination with fuel and compressed-air valves, adjustable valve-gear mechanism provided with means for operation of either the fuel or the compressed-air valve, means for adjusting said valve-gear to bring it into operative relation with either of such valves, and means for operating the valve-gear mechanism on a four-stroke cycle when in operative relation with the fuel-valve and on a two-stroke cycle when in operative relation with the compressed-air valve.

5. In an internal-combustion engine, the combination with fuel and compressed-air valves, adjustable valve-gear mechanism adapted to be brought into operative relation with either of such valves, and means for adjusting said valve-gear to operative relation with either of such valves, operating eccentric mechanism operated by the engine on each revolution thereof, auxiliary eccentric mechanism adapted to be operated by the engine on each two revolutions thereof and controlling the operative relation of the operating eccentric mechanism with the valve-gear mechanism, so as to operate the fuel-valve on a four-stroke cycle, a clutch connection between the engine and the auxiliary valve-gear mechanism, and means operatively connected with the valve-gear-adjusting means to disengage the clutch and hold the auxiliary controlling means in position to continually maintain the operative relation of the main eccentric mechanism and the valve-gear mechanism when the latter is in the air-valve-operating position, so as to operate the compressed-air valve on a two-stroke cycle.

6. In an internal-combustion engine, the combination of fuel and compressed-air valves, valve-gear mechanism adjustable to engaging relation with either of such valves, operating mechanism operated by the engine in every revolution, auxiliary controlling mechanism operated by the engine in every two revolutions, a clutch controlling the connection of such auxiliary mechanism with the engine and controlling means for said clutch.

7. In an internal-combustion engine, the combination of fuel and compressed-air valves, valve-gear mechanism adjustable to engaging relation with either of such valves, operating mechanism operated by the engine in every revolution, auxiliary controlling mechanism operated by the engine in every two revolutions, a clutch controlling the connection of such auxiliary mechanism with the engine and controlling means for said clutch and for the valve-gear, operating to engage the clutch when the valve-gear is in operative relation with the fuel-valve, and to disengage the clutch when the valve-gear is in operative relation with the compressed-air valve.

8. In an internal-combustion engine, the combination of fuel and compressed-air valves, valve-gear mechanism adjustable to engaging relation with either of such valves, operating mechanism operated by the engine in every revolution, auxiliary controlling mechanism operated by the engine in every two revolutions, a clutch controlling the connection of such auxiliary mechanism with the engine and controlling means for said clutch and for the valve-gear, operating to engage the clutch when the valve-gear is in operative relation with the fuel-valve, and to disengage the clutch when the valve-gear is in operative relation with the compressed-air valve, and provided with means for stopping the auxiliary controlling mechanism upon disengagement of the clutch, to maintain such mechanism in position to operate the valve-gear on a two-stroke cycle.

9. In an internal-combustion engine, the combination of fuel and compressed-air valves, valve-gear mechanism adjustable to engaging relation with either of such valves, operating mechanism operated by the engine in every revolution, auxiliary controlling mechanism operated by the engine in every two revolutions, a clutch controlling the connection of such auxiliary mechanism with the engine and controlling means for said clutch and for the valve-gear, operating in one position to engage the clutch and place the valve-gear in operative relation with the fuel-valve, in another position to disengage the clutch and place the valve-gear in operation with the air-valve, and in an intermediate position to remove the valve-gear from operative relation with both fuel and air valves.

10. In an internal-combustion engine, the combination of fuel and compressed-air valves, valve-gear mechanism adjustable to engaging relation with either of such valves, operating mechanism operated by the engine in every revolution, auxiliary controlling mechanism operated by the engine in every two revolutions, a clutch controlling the connection of such auxiliary mechanism with the engine and controlling means for said clutch and for the valve-gear, operating in one position to engage the clutch and place the valve-gear in operative relation with the fuel-valve, in another position to disengage the clutch and place the valve-gear in operation with the air-valve, and in an intermediate position to remove the valve-gear from operative relation with both fuel and air valves while maintaining the disengagement of the clutch.

11. A valve mechanism comprising two valves, a reciprocating valve-gear having toes adapted to operate either valve according to the angular position of such valve-gear, operating means adapted to operate said valve-gear at two different periodicities, and controlling means for causing said valve-gear to come into operative relation with one of said valves when operating at one periodicity, and to come into operative relation with the other valve when operating at the other periodicity.

12. The combination with an engine, of valve mechanism comprising valve-gear, operating eccentric mechanism, auxiliary eccentric mechanism controlling the operative relation of the operating eccentric mechanism with the valve-gear, means comprising a clutch for operating said auxiliary eccentric mechanism from the engine, and disconnecting devices for said clutch comprising a cam device revolving with the clutch and a controlling device engaging such revolving cam device to open the clutch.

13. The combination with an engine, of valve mechanism comprising valve-gear, operating eccentric mechanism, auxiliary eccentric mechanism controlling the operative relation of the operating eccentric mechanism with the valve-gear, means comprising a clutch for operating such auxiliary eccentric mechanism from the engine, and disconnecting devices for said clutch comprising a cam and stop device revolving with the clutch and a controlling device engaging such revolving cam and stop device to open the clutch and stop the auxiliary eccentric mechanism in definite position.

ARTHUR J. FRITH.

Witnesses:
G. A. TAYLOR,
HARRY E. KNIGHT.